White & King.
Milk Cooler.

Nº 78,777. Patented June 9, 1868.

Witnesses:

Inventors:

United States Patent Office.

WARREN W. WHITE AND MARTIN KING, OF LOWVILLE, NEW YORK.

Letters Patent No. 78,777, dated June 9, 1868.

IMPROVED REFRIGERATING MILK-CAN.

*The Schedule referred to in these Letters Patent and making part of the same.*

Be it known that we, WARREN W. WHITE and MARTIN KING, both of the town of Lowville, county of Lewis, and State of New York, have invented a new and improved Milk-Can; and we hereby declare that the following is a full and exact description thereof, reference being had to the accompanying drawings, and the letters of reference marked thereon, making a part of this specification, in which—

Figure 1:
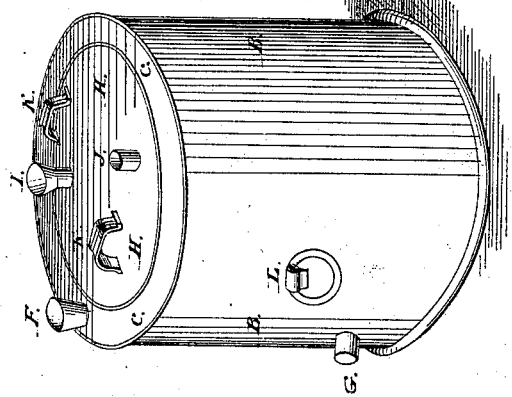

Figure 1 is a perspective view.

Figure 2:
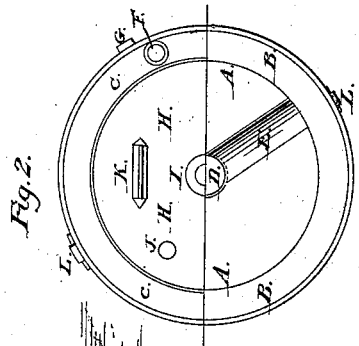

Figure 2, a half plan of top and bottom.

Figure 3:
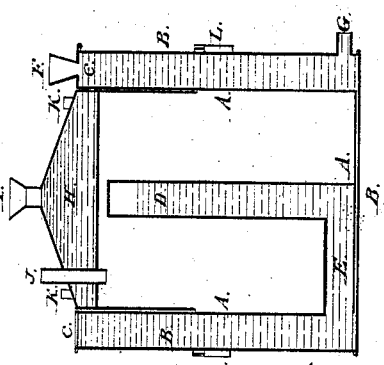

Figure 3, a section, answering to either, longitudinal or transverse.

The general character of our invention consists in providing a milk-can for the use of farmers and others in carrying their milk to cheese-factories, which milk-can shall produce and maintain a temperature of the milk sufficiently lower than the natural and ordinary temperature thereof, so that thereby the frequent souring, so prevalent with the ordinary milk-can, will be prevented.

In the accompanying drawings, the volume of the cooling-liquid is designed to be about equal to the volume of milk to be cooled down.

To enable others to construct and use our invention, we will proceed to describe its construction and operation.

We construct a vessel of any desired form and capacity, making the inside, or surface in connection with the milk, of tin of suitable strength.

In the illustration accompanying this specification, the vessel is a cylinder. Call it the milk-chamber A A A. Around this chamber is another one, B B B, which may be of tin, iron, or wood. This outer cylinder is concentrically fastened to the inner chamber by the annular top, C C, and the bottoms of both vessels are also secured to each other.

This construction gives us a water-tight jacket or chamber, B A B A, around the milk-chamber, and into which the cooling-medium is passed by the funnel-pipe F.

In the side of the milk-chamber, near the bottom, there is an aperture, to which the elbow E is secured, and this elbow E connects with an upright cylinder, D, rising from the bottom of the milk-chamber A A A, at its centre. This upright cylinder D is a little less in height than the jacket formed by the cylinders B B B and A A A.

It is apparent, the vertical column D and the cooling-space before referred to will fill up simultaneously.

The lid or cover of the milk-chamber is made hollow, (see fig. 3,) so as to hold a portion of the cooling-liquid.

This lid H is supplied with an air-escape pipe, J, and a funnel-pipe, I, for filling and emptying the cooling-fluid.

On the annular top, C C, of the jacket, containing the cold liquid, there is a funnel-pipe, F, for the purpose of filling the jacket, and, as will be perceived, filling at the same time the central cylinder D. On the outside of the jacket there is a pipe or faucet, G, from which the cooling-liquid may be run off.

The operation is simple. The can or vessel, except the cover, may, in the first instance, be charged with cooling-liquid in the place provided for it, and the milk, as it comes from the cows, after straining, may be poured in. It will soon come to an equilibrium. Then, when ready to start for the factory, run off the cooling-liquid, now elevated to the temperature of equilibrium, refill with the cooling-liquid, and also fill the cover, and place it over the milk-chamber, and thus a cold surface is presented to the enclosed milk all around and through its centre and on the top.

Any little elevation of temperature that, in hot weather, would be due to the caloric absorbed from the atmosphere, will be more than compensated for by charging the can twice with the cooling-liquid, and it is only in extremely hot weather that this twice charging will be necessary.

What we claim as our invention, and desire to secure by Letters Patent, is—

The combination of the jacket A B and cylinder D, together with the hollow lid H, the ventilating-tube J, and the connecting-tube E, substantially as specified, and for the purposes therein set forth.

WARREN W. WHITE,
MARTIN KING.

Witnesses:
H. ALLGOEVER,
ABRAM FLINT,
GEO. S. CASE.